(12) United States Patent
Gossain et al.

(10) Patent No.: US 8,588,146 B2
(45) Date of Patent: Nov. 19, 2013

(54) METHOD AND APPARATUS FOR CHANNEL SELECTION IN A WIRELESS COMMUNICATION SYSTEM

(75) Inventors: Hrishikesh Gossain, Lake Mary, FL (US); Keith J. Goldberg, Casselberry, FL (US); Samer S. Hanna, Sanford, FL (US); Pavan K. Rudravaram, San Diego, CA (US); Sebnem Zorlu Ozer, North Wales, PA (US)

(73) Assignee: Motorola Solutions, Inc., Schaumburg, IL (US)

( * ) Notice: Subject to any disclaimer, the term of this patent is extended or adjusted under 35 U.S.C. 154(b) by 773 days.

(21) Appl. No.: 12/257,374

(22) Filed: Oct. 23, 2008

(65) Prior Publication Data

US 2010/0103850 A1 Apr. 29, 2010

(51) Int. Cl.
*H04W 4/00* (2009.01)
(52) U.S. Cl.
USPC ........................................ 370/329; 455/452.1
(58) Field of Classification Search
None
See application file for complete search history.

(56) References Cited

U.S. PATENT DOCUMENTS

| | | | |
|---|---|---|---|
| 6,912,204 B2 | 6/2005 | Kossi et al. | |
| 2004/0264394 A1 | 12/2004 | Ginzburg et al. | |
| 2005/0220079 A1* | 10/2005 | Asokan | 370/352 |
| 2006/0109815 A1* | 5/2006 | Ozer et al. | 370/329 |
| 2006/0242457 A1 | 10/2006 | Roy et al. | |
| 2006/0252418 A1 | 11/2006 | Quinn et al. | |
| 2007/0070937 A1 | 3/2007 | Demirhan et al. | |
| 2007/0104139 A1 | 5/2007 | Marinier et al. | |

OTHER PUBLICATIONS

PCT/US2009/058134 (Corresponding International Application)—International Search Report with Written Opinion, mailing date Apr. 30, 2010—12 pages.

* cited by examiner

*Primary Examiner* — Jianye Wu
(74) *Attorney, Agent, or Firm* — Randi L. Karpinia; Brian M. Mancini

(57) ABSTRACT

A node in a wireless communication system announces a channel switch operation to facilitate a smooth transition to other channel. The node detects a requirement to discontinue communications at a first channel and sends a message to a plurality of neighboring nodes in response to detecting the requirement. Generally, the message comprises at least a reason for discontinuation of communications at the first channel and a duration for the channel switch operation after which the node is available for communications at the first channel or an alternate channel. Each of the plurality of neighboring nodes can determine based on the message and the neighborhood conditions a requirement to scan alternate channels to initiate communications with other nodes.

19 Claims, 6 Drawing Sheets

| OCTETS | | | | | | | |
|---|---|---|---|---|---|---|---|
| | ELEMENT ID | LENGTH | CHANNEL SWITCH REASON CODE | AVAILABLE CHANNELS | INTERIM CHANNEL SWITCH START COUNT | INTERIM CHANNEL SWITCH DURATION COUNT | INTERIM CHANNEL SWITCH OFFSET | ORIGINATOR DEVICE TYPE |
| | 1 | 1 | 1 | 1 | 2 | 2 | 2 | 1 |

MESH INTERIM CHANNEL SWITCH ANNOUNCEMENT ELEMENT

*FIG. 5*

| CHANNEL SWITCH REASON CODE | VALUE |
|---|---|
| 0 | RADAR DETECTION |
| 1 | REGULAR CHANNEL STUDY |
| 2 ... 255 | RESERVED |

CHANNEL SWITCH REASON CODE

*FIG. 6*

| OCTETS | | | | | | | |
|---|---|---|---|---|---|---|---|
| | ELEMENT ID | LENGTH | CHANNEL SWITCH MODE | NEW CHANNEL NUMBER | CHANNEL SWITCH COUNT | CHANNEL SWITCH REASON CODE | ORIGINATOR DEVICE TYPE |
| | 1 | 1 | 1 | 1 | 1 | 1 | 1 |

MESH CHANNEL SWITCH ANNOUNCEMENT

METHOD AND APPARATUS FOR CHANNEL SELECTION IN A WIRELESS COMMUNICATION SYSTEM

FIELD OF THE DISCLOSURE

The present disclosure relates generally to wireless communications and more particularly to a method and apparatus to select a channel in a wireless communication system.

BACKGROUND

In recent years, a type of mobile communications network known as an ad-hoc network has been developed. An ad-hoc network typically includes a number of geographically-distributed, potentially mobile units, sometimes referred to as "nodes," which are wirelessly connected to each other by one or more links (e.g., radio frequency communication channels). In this type of network, each mobile node is capable of operating as a base station or router for the other mobile nodes, thus eliminating the need for a fixed infrastructure of base stations.

A wireless mesh network is a collection of wireless nodes or devices organized in a decentralized manner to provide range extension by allowing nodes to be reached across multiple hops. In a multi-hop network, communication packets sent by a source node can be relayed through one or more intermediary nodes before reaching a destination node. A large network can be realized using intelligent access points (IAP) which provide wireless nodes with access to a wired backhaul. A mesh network therefore typically comprises one or more IAPs (Intelligent Access Points), and a number of APs (Access Points), which provide data service to STAs (subscriber stations). An AP can connect to IAP directly or through multi-hop route. More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet.

Typically, in a mesh network an IAP communicates with the APs by transmitting and receiving packets on radio channels. In certain cases, the IAP switches the channel on which it is communicating with the APs. For example, the IAP switches its channel when it detects a Radar signal on the channel. If during operation, an IAP detects a radar event over the Radio Frequency (RF) channel that the network backhaul uses, it must immediately change to another available RF channel. This is dictated by Federal Communications Commission (FCC) and European Telecommunications Standards Institute (ETSI) standards, and is established to allow the sharing of the five GigaHertz (5 GHz) spectrum between wireless LAN (WLAN) and military or weather radars that use the same frequencies. Alternatively, the IAP can switch channel if it detects a need for a periodic scan, or if it detects a weak radio link with the APs.

In some traditional mesh systems, it takes significant amount of time for an AP to detect the loss of an IAP when the IAP switches its channel of operation. Conventionally, a mesh AP will detect a lost connection with IAP after missing infrastructure hello frames or by timing out. Also, additional time is spent by the AP in scanning for new channels and then associating with the same or a new IAP. Generally, during the transition period of the channel switch operation at the IAP, associated APs are unable to provide meshing services to their clients.

Accordingly, there is a need for a method and apparatus to select a channel in a wireless communication system to facilitate a smooth channel switch operation.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5 is a diagram illustrating a format of a Mesh Interim Channel Switch Announcement (MI-CSA) in accordance with some embodiments.

FIG. 6 is diagram illustrating a table for the channel switch reason code in accordance with some embodiments.

Figure 1:
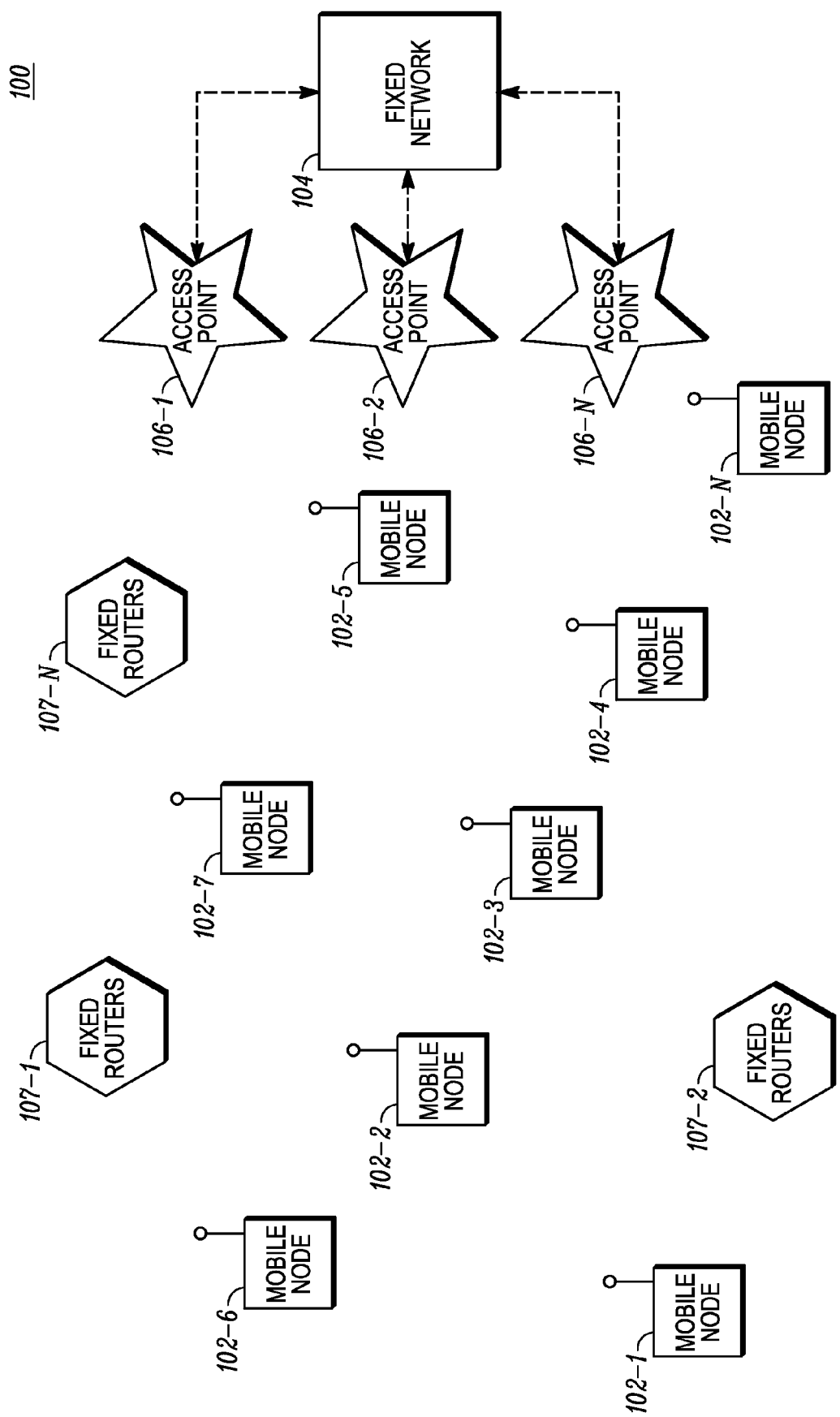
FIG. 1 is a block diagram illustrating an example of a wireless communications system employing a method in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to various embodiments, a node in a wireless communication system announces a channel switch operation to facilitate a smooth transition to another channel. The node detects a requirement to discontinue communications at a first channel and sends a message to a plurality of neighboring nodes in response to detecting the requirement. Generally, the message comprises at least a reason for discontinuation of communications at the first channel and a duration for the channel switch operation after which the node is available for communications at the first channel or an alternate channel.

Referring now to drawings, and in particular FIG. 1, a wireless communication system is shown and indicated at 100. In accordance with some embodiments, nodes in the wireless communication system 100 implement a method to select a channel for communication with other nodes. Those skilled in the art will recognize and appreciate that the specifics of this example are merely illustrative of various embodiments and that the teachings set forth herein are applicable in a variety of alternative settings. For example, in some embodiments, the nodes in the wireless communication system 100 operate in accordance with standards promulgated by Institute of Electrical and Electronics Engineers (IEEE) and Internet Engineering Task Force (IETF), such as IEEE drafts for 802.11(s), 802.11(u), 802.11(k), and 802.11(h). (For this and any IEEE standards recited herein, see: http://standards.ieee.org/getieee802/index.html or contact the IEEE at IEEE, 445 Hoes Lane, PO Box 1331, Piscataway, N.J. 08855-1331, USA.) It will be appreciated by those of ordinary skill in the art that the teachings disclosed herein are not limited to any particular system implementation. As such, other alternate implementations using different communications systems operating on different protocols are contemplated and within the scope of the various teachings described herein. Generally, the teachings disclosed herein are applicable in any wireless communication system which can dynamically alter their topology and/or operational parameters to respond to the needs of a particular user while enforcing operating and regulatory policies and optimizing overall network performance. Cognitive networks are examples of such smart networks.

As shown in FIG. 1, the wireless communication system 100 includes a plurality of mobile nodes 102-1 through 102-$n$ (referred to generally as nodes 102, user terminals 102, or stations (STAs) 102). The STAs 102 can be wireless or can communicate over wired connections. The wireless communication system 100 can further include, although not required, a fixed network 104. The fixed network 104 can include, for example, a core local area network (LAN), and a plurality of servers and gateway routers to provide network nodes with access to other networks, such as other ad-hoc networks, the public switched telephone network (PSTN) and the Internet. The fixed network 104 can further comprise a bridge component (not shown) that broadcasts, for example, Institute of Electrical and Electronics Engineers (IEEE) Standard 802.1 updates that are used by Ethernet switches to update port routing information. A plurality of access points (APs) 106-1, 106-2 ... 106-$n$ (referred to generally as nodes 106, intelligent access points (IAPs) 106), provide nodes 102 with access to the fixed network 104. For purposes of this discussion, APs 106 are the same as IAPs 106, except they can be mobile and communicate with the core network 104 via an IAP 106 that is coupled to the core network 104.

The wireless communication system 100 further includes a plurality of fixed routers 107-1 through 107-$n$ (referred to generally as nodes 107, wireless routers (WRs) 107 or fixed routers 107) for routing data packets between other nodes 102, 106 or 107. It is noted that for purposes of this discussion, the nodes discussed above can be collectively referred to as "nodes 102, 106 and 107", or simply "nodes". As can be appreciated by one skilled in the art, the nodes 102, 106 and 107 are capable of communicating with each other directly, or via one or more other nodes 102, 106 or 107 operating as a router or routers for packets being sent between nodes. Each of the nodes 102, 106, and 107 has at least a transceiver, a processing device, a memory unit, an amplifier, and an interface to communicate with other nodes in the wireless communication system.

Figure 2:
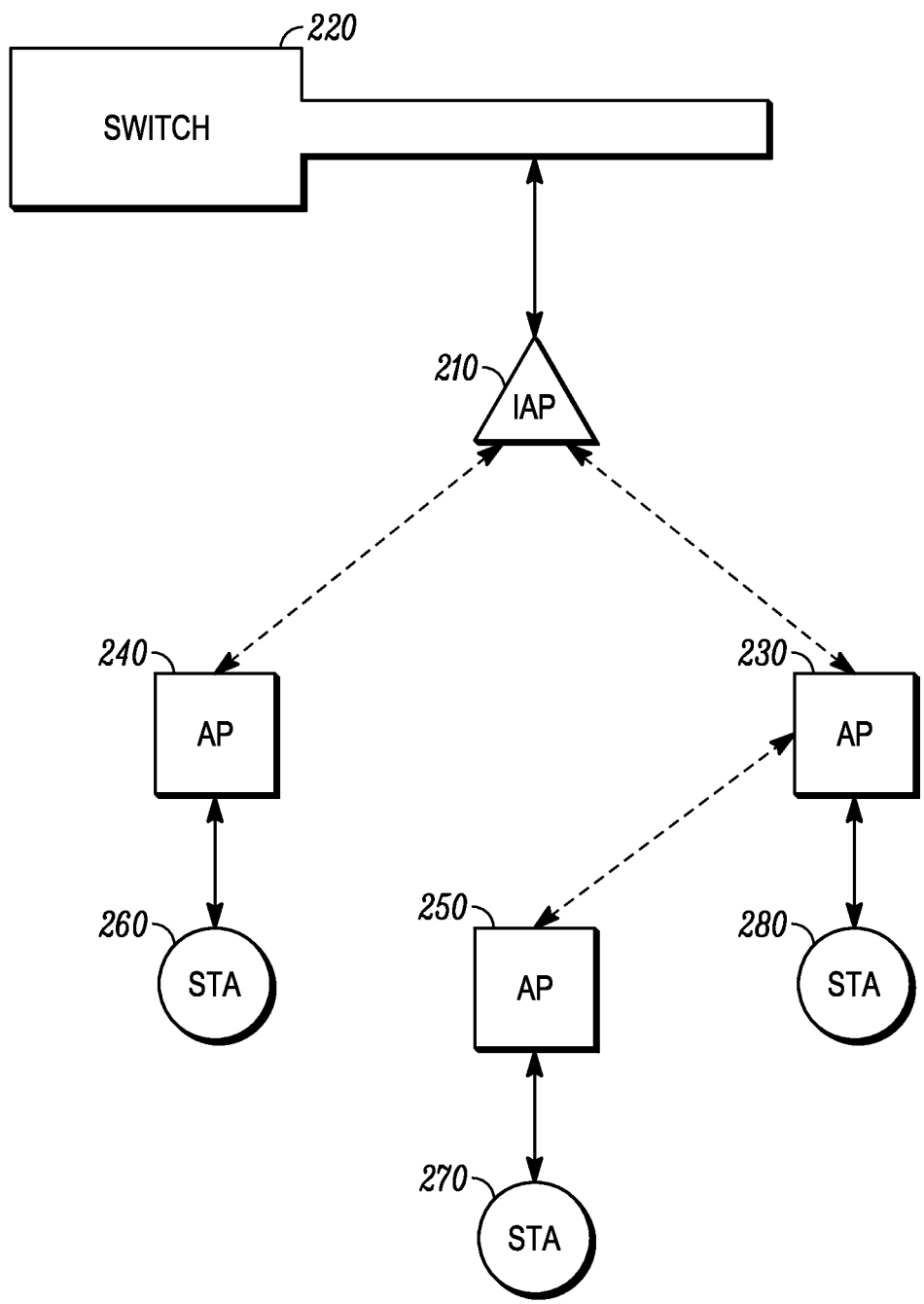
FIG. 2 is a block diagram illustrating a portion of an ad-hoc network employing a method in accordance with some embodiments.

Referring now to FIG. 2, a portion of an ad-hoc network for employing a method in accordance with some embodiments is shown. As shown in FIG. 2, the ad-hoc network 200 comprises an IAP 210, a plurality of APs 230, 240, and 250 and a plurality of STAs 260, 270, and 280. The IAP 210 connects the associated APs to an external network via a switch 220. As shown in FIG. 2, APs 230, 240 communicate directly with the IAP 210 by establishing wireless links. Also, AP 250 communicates with IAP 210 via AP 230. This is an example of multi hop ad-hoc communications.

Generally, in an ad-hoc network, network formation occurs when an AP powers up and binds with an IAP. For example, after powering up, APs 230, 240, and 250 start a network discovery and selection process. It will be appreciated by those of ordinary skill in the art that any suitable technique can be used by nodes in the network formation scenarios. Suitable techniques for initial network formation are described in US patent Publication No. US 2006/0109815 entitled "System and Method for Dynamic Frequency Selection in a Multihopping Wireless Network." The channel of communications with IAP 210 may be preconfigured or selected dynamically.

Typically, after network formation, the IAP 210 and APs 230, 240, and 250 periodically broadcast "hello message" packets that carry routing information and management frames such as beacons. An AP can detect a lost IAP wireless link by not receiving the hello messages or by timing out. In ad-hoc networks, an IAP can switch the channel on which it is communicating with the APs because of several reasons. In one embodiment, an IAP switches its channel after detecting a radar signal on the channel. In alternate embodiments, an IAP can switch its channel when it detects congestion in the ad-hoc network and/or after detecting a need for a periodic scan to find better channels. In order to facilitate a smooth channel switch operation, the IAP informs all neighboring and/or associated APs about the channel switch operation in accordance with some embodiments. For example, in ad hoc network 200 the IAP 210 announces its channel switch operation to APs 230 and 240 by sending a channel switch announcement. Generally, information related to the channel switch operation is distributed to all nodes (APs and STAs) associated with the IAP which is switching its channel. For example, as shown in FIG. 2, AP 230 can forward the channel switch announcement from IAP 210 to AP 250. In accordance with some embodiment, the channel switch announcement comprises a reason for the channel switch operation, and the nature of the channel switch (temporary or permanent), and a duration of the channel switch operation.

Figure 3:
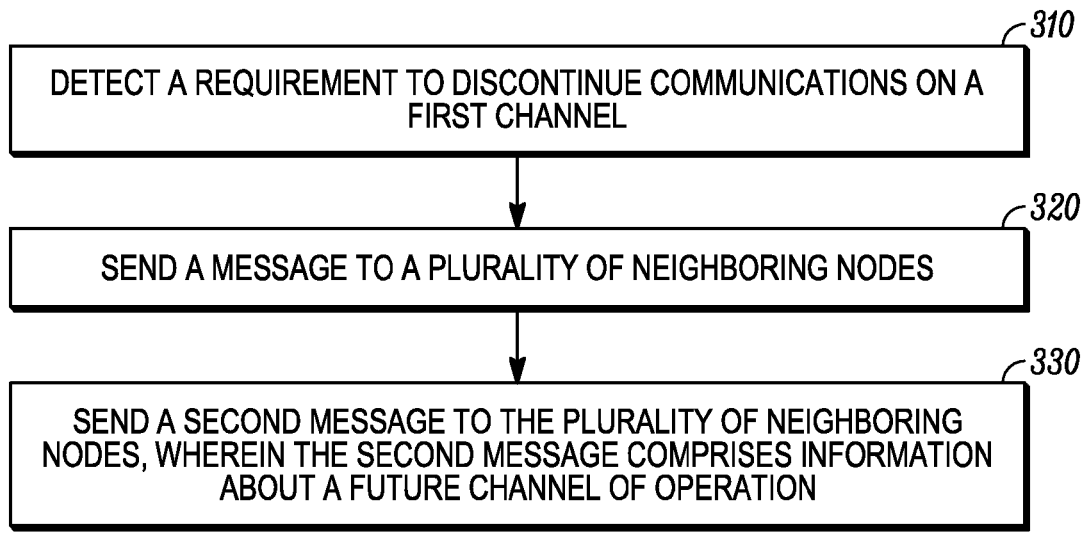
FIG. 3 is a flowchart of a method of channel selection in a wireless communication network in accordance with some embodiments.

Referring now to FIG. 3, a flow diagram illustrating a method 300 of channel selection at a node in a wireless communication device in accordance with some embodiments is shown. In general, the method 300 can be implemented at any portal/gateway such as IAP 210 shown in FIG. 2. It will be appreciated by those of ordinary skill in the art that the method 300 illustrated by reference to FIG. 3 includes functionality that may be performed in hardware, firmware, software or a combination thereof and may further be performed at a single node or a combination of nodes in the wireless communication system 100. Also, one or more steps of the method 300 can be performed at supporting hardware units external to the nodes.

Illustrative details for implementing the method 300 will next be described. In general, the method 300 is a procedure for announcing the channel switch operation and selecting a channel for communications in a wireless communication system. At step 310, a node in the wireless communication system detects a requirement to discontinue communications on a first channel. In one embodiment, the detecting comprises detecting a radar signal on the first channel. In an alternate embodiment, the detecting comprises detecting congestion at the node. Generally, the state of congestion at a node is determined based on the link quality of the node with associated nodes. In yet another embodiment, the determining comprises detecting a need for a periodic scan at the node. For example, a node in a wireless communication system can periodically scan available channels to find the best available channel.

After detecting a requirement to discontinue communications on the first channel, the node communicates the channel switch operation to all associated nodes. In general, the channel switch operation is characterized by a transition phase during which the node is not able to communicate on the first channel. Once the channel switch operation is complete, the node can resume communications on the first channel or alternate channels. In accordance with some embodiments the node selects the alternate channel by scanning a list of available channels during the transition phase (also referred as the duration for the channel switch operation). In one embodiment, when the reason for discontinuation of communication at the first channel is detection of radar signal, the duration for the channel switch operation is less than equal to "CHANNEL_MOVE_TIME" which is defined by regularity authorities such as Federal Communications Commission (FCC) and European Telecommunications Standards Institute (ETSI).

At step 320, the node sends a message to a plurality of neighboring nodes which are associated with the node. In accordance with some embodiments, the message is a Mesh Interim Channel Switch Announcement (MI-CSA) as shown in FIG. 5. In general, the message comprises at least a reason for discontinuation of communications on the first channel, duration of channel switch operation (transition phase duration), information about originator device type and a list of available channels. As described above, the channel switch announcement can be distributed to all associated nodes by forwarding the message across multiple hops so that the message indicating the channel switch operation is received by all associated nodes. In accordance with some embodiments, the node multicasts or broadcasts the message to all associated nodes which have a direct radio link with the node. These nodes, in turn can forward the message by multicasting or broadcasting to all nodes which are indirectly (multi-hop) associated with the node.

Figures 7, 8:
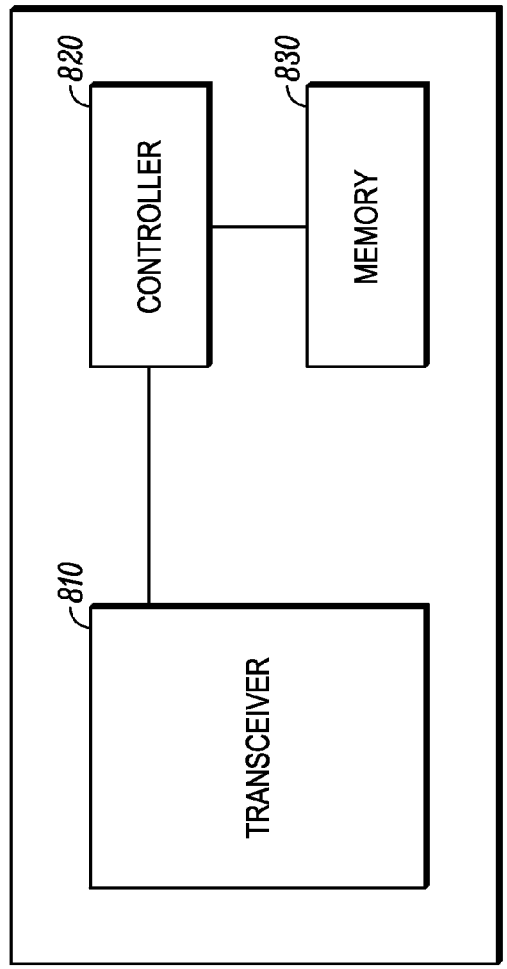
FIG. 7 is a diagram illustrating a format of a Mesh Channel Switch Announcement (M-CSA) in accordance with some embodiments.
FIG. 8 is a block diagram illustrating an apparatus of a node employed in the network shown in FIG. 1.

At step 330, the node sends a second message to the plurality of nodes which are associated with the node. In accordance with some embodiments, the second message is a Mesh Channel Switch Announcement (M-CSA) as shown in FIG. 7. In general, the second message comprises information about a future channel of operation and the reason for discontinuation of communications on the first channel. Typically, the future channel of operation comprises one of the first channel or the alternate channel wherein the alternate channel is selected after scanning during the channel switch operation. Generally, as soon as the node determines the future channel of operation, the node communicates the future channel information with all associated nodes by sending the second message. Since the node has already defined and communicated (by sending the message) the maximum duration for scanning (duration of channel switch operation) to all associated nodes, typically, the second message is sent within the duration of the channel switch operation. It will be appreciated by those having ordinary skill in the art that if the node fails to send the second message within the duration of the channel switch operation then the node can send the message again announcing an extension in the duration of the channel switch operation. For example, in accordance with some embodiments the node can resend a new MI-CSA to all associated nodes if it fails to find alternate channel within the duration communicated by the first MI-CSA.

In accordance with some embodiments, sending of the second message comprises multicasting or broadcasting the message to all associated nodes which are directly connected to the node (single hop communication). These nodes, forward the second message to other nodes which are indirectly associated with the node.

Figure 4:
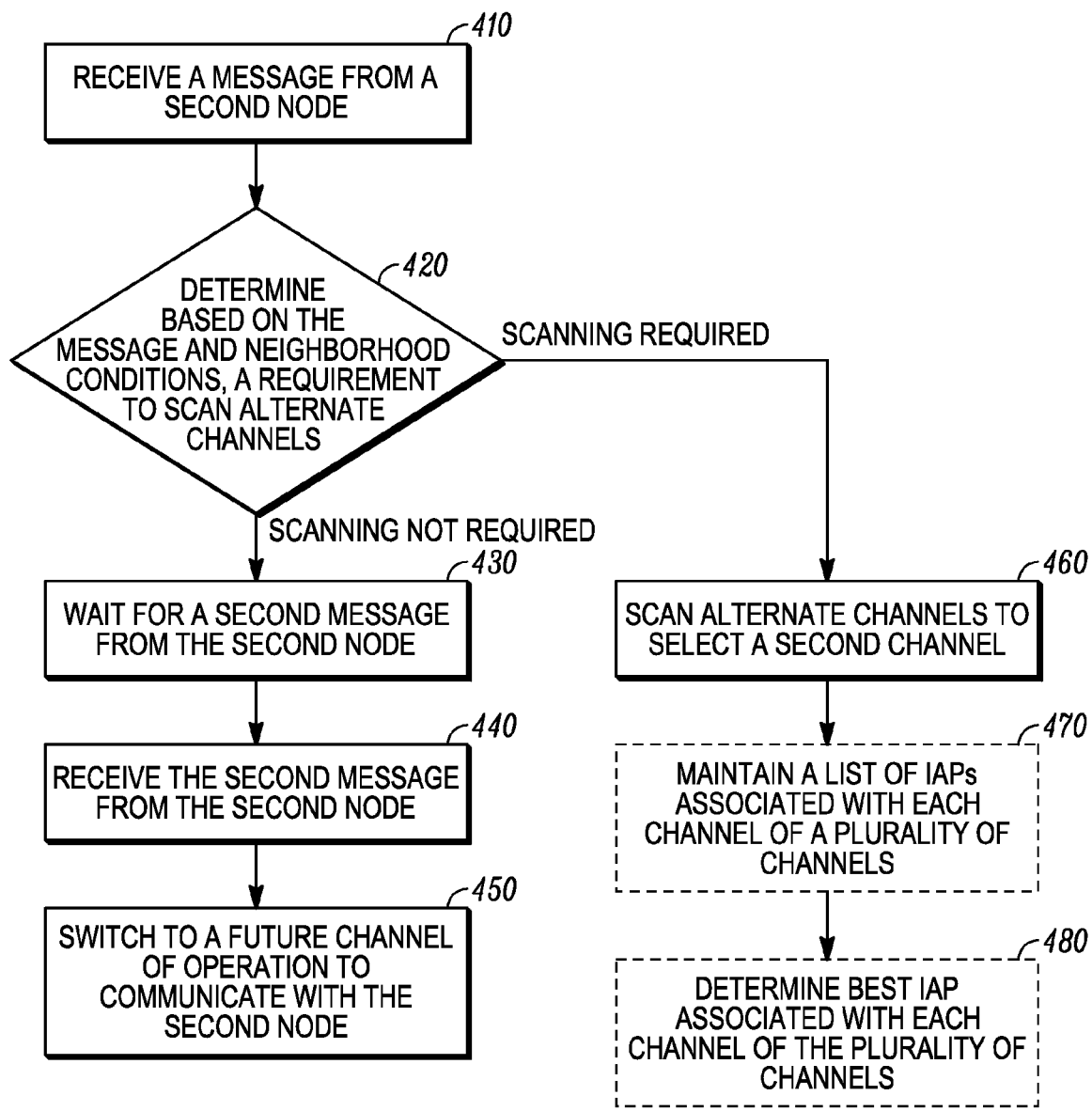
FIG. 4 is a flowchart of a method of channel selection in a wireless communication network in accordance with some embodiments.

Referring now to FIG. 4, a flow diagram illustrating a method 400 of channel selection at a node in a wireless communication device in accordance with alternate embodiments is shown. In general, the method 400 can be implemented at any node such as APs 230, 240, 250 shown in FIG. 2. It will be appreciated by those of ordinary skill in the art that the method 400 illustrated by reference to FIG. 4 includes functionality that may be performed in hardware, firmware, software or a combination thereof and may further be performed at a single node or a combination of nodes in the wireless communication system 100. Also, one or more steps of the method 400 can be performed at supporting hardware units external to the nodes.

Illustrative details for implementing the method 400 will next be described. In general, the method 400 is a procedure for selecting a channel for communication at a node in a wireless communication system. At step 410, the node receives a message from a second node. In accordance with some embodiments, second node is an IAP. However, in accordance with alternate embodiments the second node is a wireless router (WR). Generally, the message comprises information indicating at least a reason for discontinuation of communications by the second node on a first channel, a duration for the channel switch operation at the second node, and availability of other channels at the second node for communications. In accordance with some embodiments, the received message is a Mesh Interim Channel Switch Announcement (MI-CSA) as shown in FIG. 5. In one embodiment, the reason comprises presence of a radar signal on the first channel. In an alternate embodiment, the reason comprises congestion at the second node. Generally, the state of congestion at a node is determined based on the link quality of the node with associated nodes. In yet another embodiment, the reason comprises detecting a need for a periodic scan at the second node. For example, a node in a wireless communication system can periodically scan available channels to find the best available channel.

In accordance with some embodiments, the node forwards the received message to other nodes which are indirectly connected to the second node (via the node). In accordance with some embodiments, the decision to forward the message is based on the information in the message, wherein the message further comprises originator device type. Generally, the node helps the second node in distributing the channel switch announcement to all associated nodes by forwarding the message. It will be appreciated by those skilled in the art that any suitable transmission technique such as broadcast or multicast can be used by nodes to send the message.

At step 420, the node determines based on the message and the neighborhood conditions a requirement to scan alternate channels to initiate communications with other nodes. In one embodiment, the node may decide to scan alternate channels based on the reason for channel switch, available channels, and duration of channel switch operation. For example, the node initiates scanning after detecting presence of hard coded channel(s) at the second node and the reason to be a "radar detect." Also, the decision to scan for alternate channels depends on the duration of the channel switch operation. For example, if the node determines that the duration of channel switch operation is short and there is no urgent requirement for communication, the node might not initiate scanning of alternate channels. In alternate embodiment, the node determines based on neighborhood conditions, the requirement to scan for alternate channels. For example, if the node knows about alternate gateways/IAPs on the same channel (with acceptable route metric), the node might not initiate channel scan process. It will be appreciated by those having ordinary skill in the art that a combination of two or more conditions described above can be used by the node to determine if there is a requirement to scan for alternate channels.

As shown in FIG. 4, when the node determines that scanning is not required the method flow moves to step 430. A step 430, the node waits for a second message from the second node. Typically, the wait period is less than equal to the duration of the channel switch operation communicated in the message. At step 440, the node receives a second message from the second node. In accordance with some embodiments, the second message is a Mesh Channel Switch Announcement (M-CSA) as shown in FIG. 7. In general, the second message comprises information about a future channel of operation and the reason for discontinuation of communications on the first channel.

At step 450, the node switches to the future channel of operation communicated by the second node. The future channel of operation is generally one of the first channel and an alternate channel scanned by the second node during the duration of the channel switch operation (transition phase).

As shown in FIG. 4, when the node determines that scanning is required the method flow moves to step 460. At step 460, the node scans alternate channels to select a second channel to bind to the second node or a different node (IAP, gateway, WR, and the like). At step 470, the node maintains a list of IAPs associated with each channel of a plurality of channels. In accordance with some embodiments, the list of IAPs associated with each channel is not flushed out even when the node scans a new channel and starts operating on the new channel. At step 480, the node determines best IAP associated with each channel of the plurality of channels. Generally, the node determines the best IAP for each channel based on route metrics and Received Signal Strength Indicator (RSSI). It will be appreciated by those having ordinary skill in the art that by maintaining a list of IAPs/gateways on each channel and the best IAP for each channel at the node a fast handoff to a new IAP is facilitated. For example, the node can detect a radar signal locally on the current channel and this would lead to discontinuation of communications on the current channel. In this situation, the node would scan alternate channels to bind with other IAPs. Information about the list of available channels, IAPs on each of the channel in the list, and best IAP on each channel would facilitate a fast handoff to a new IAP.

Mesh Interim Channel Switch Announcement (MI-CSA) Element

FIG. 5 is a diagram illustrating a format of a Mesh Interim Channel Switch Announcement (MI-CSA) in accordance with some embodiments. As shown in FIG. 5, the MI-CSA element comprises fields for element identification (ID), length, channel switch reason code, available channels, interim channel switch start count, interim channel switch duration count, interim channel switch offset, and originator device type. FIG. 5 also shows the number of octets allocated to each field. For example, the fields element ID, length n channel switch reason code, available channels, and originator device type have one (1) octet allocated. Similarly, the fields interim channel switch start count, interim channel duration count, and interim channel offset have two (2) octets allocated. It will be appreciated by those skilled in the art that the octet values allocated to different fields as shown in FIG. 5 are for example purposes only. In accordance with alternate embodiments, for different implementation scenarios different octet values can be allocated to the fields.

Generally, MI-CSA is used by a AP/IAP to inform its neighbors that the AP/IAP will be unavailable in the current channel for a specified period of time. This is done to facilitate the scanning procedure at AP/IAP. In accordance with one embodiment, an AP after receiving a MI-CSA waits for the duration included in the announcement frame before concluding (for example: clearing routing table) that the AP/IAP is no longer available in current channel. Typically, an AP/IAP after sending a MI-CSA also sends a Mesh Channel Switch Announcement (M-CSA) (shown in FIG. 6) to indicate its future channel of operation.

In addition to the duration field, the MI-CSA includes information about the available channels at the AP/IAP (e.g. channel is not hard-coded or marked) and the reason for going out of channel. In accordance with some embodiments nodes after receiving a MI-CSA use the Available Channel and Reason Code fields to decide if they should wait for M-CSA. For example, if AP/IAP has a hard-coded channel and reason-code was "Radar Detect", receiving AP may decide to do its own scanning procedure. In case a radar is detected (from Channel Switch Reason Code) and the AP/IAP has Radar avoidance flag set and it is operating in a hard-coded or marked channel, the AP/IAP makes the available channel to 0 (until the AP/IAP is sure that that it can operate on its current channel as per radar avoidance guidelines from regulatory authority). If the radar avoidance flag is not set, available channel should be set to one (1) for the hard-coded or marked channel. Otherwise this value should be set to potential available number of channels including its current channel of operation.

The Interim Channel Switch Start Count field is either set to the number of Target Beacon Transmission Times (TBTTs) until the AP/IAP sending the MI-CSA element switches to another channel. Typically, a value of one (1) indicates that the switch will occur after the next TBTT and a value of zero (0) indicates that the switch will occur immediately after the frame containing the element is transmitted. The Interim Channel Switch Duration Count field shall be set to the number Transmission Units (TUs=one millisecond (1 ms)) until the AP/IAP sending the MI-CSA element switches to a new channel or the future channel of operation. The Interim Channel Switch Offset field is set to the offset of the start of the scanning interval from the TBTT specified by the Interim Channel Switch Count field and is expressed in TUs. The value of the Interim Channel Switch Offset field is usually less than one beacon interval.

The MI-CSA element is included in MI-CSA action frames, as described in more detail later, and may also be included in Beacon frames, and Probe Response frames. In accordance with one embodiment for implementation, the value of MI-CSA fields are set as follows:

| | |
|---|---|
| Channel Switch Reason Code | 0 (-> Radar Detection) |
| Available Channels | Variable |
| Interim Channel Switch Start Count | 0 (-> switch happens immediately) |
| Interim Channel Switch Duration Count | <10000 TUs |
| Interim Channel Switch Offset | 0 |

FIG. 6 illustrates a table for the channel switch reason code in accordance with some embodiments. As shown in FIG. 6, different channel switch reason codes are associated with different channel switch reasons. For example, if the reason for channel switch operation is radar detection the channel switch reason code is set to zero (0). Similarly, if the reason for channel switch operation is regular channel study (periodic scans to find a better channel) the channel switch reason code is set to one (1). The channel switch reason codes with values from two to two hundred fifty five (2-255) are reserved.
Mesh Channel Switch Announcement (M-CSA) Element FIG. 7 is a diagram illustrating a format of a Mesh Channel Switch Announcement (M-CSA) in accordance with some embodiments. As shown in FIG. 7, the M-CSA element comprises fields for Element ID, Length, Channel Switch Mode, new Channel Number, and Channel Switch Count, Channel Switch Reason Code, and Originator Device Type. FIG. 7 also shows the number of octets allocated to each field. For example, one (1) octet allocated to all the fields: Element ID, Length, Channel Switch Mode, new Channel number, and Channel Switch Count, Channel Switch Reason Code, and Originator Device Type.

Generally, the M-CSA element is used by AP/IAP in a wireless communication system to advertise its future channel of operation and the time when the switch will occur. The format of the M-CSA element is shown in FIG. 7 and is similar to 802.11h Basic Service Set (BSS) channel switch announcement. An AP/IAP in wireless communication system may treat a Channel Switch Mode field set to one (1) as advisory. A Channel Switch Mode set to zero (0) does not impose any requirement on the receiving AP/IAP. Generally, the New Channel Number field is set to the number of the channel to which the AP/IAP is moving (as defined, for example, in clause 17.3.8.3.3 in 802.11).

Generally, the Channel Switch Count field is either set to the number of target beacon transmission times (TBTTs) until the AP/IAP sending the M-CSA element switches to the new channel or set to zero (0). A value of one (1) indicates that the switch will occur immediately before the next TBTT. A value of zero (0) indicates that the switch will occur at any time after the frame containing the element is transmitted.

The M-CSA is send as a in 802.11h Channel Switch Announcement (CSA) action frames, as described in detail below, and may be included in Beacon frames, and Probe Response frames.
Dynamic Frequency Selection (DFS) Management Frames—Action Frames The Action frame formats are defined for spectrum management in 802.11h. An Action field in the octet field immediately after the Category field, differentiates the formats. An example action field values associated with each frame format is defined in Table 1.

The MI-CSA action is transmitted by an AP/IAP in a wireless communication system to advertise a temporary channel switch for scanning. The format of the MI-CSA action frame is shown in the following figure.

Figure - MI-CSA action frame body format

| | Category | Action | Mesh Interim Channel Switch Announcement |
|---|---|---|---|
| Octets | 1 | 1 | 11 |

Generally, the Category field is set to zero (0) (representing spectrum management). Also, the Action field is set to five (5) (representing a Mesh Interim Channel Switch Announcement frame—MI-CSA).

TABLE 1

Spectrum management action field values

| Action Field Value | Description |
|---|---|
| 0 | Measurement Request |
| 1 | Measurement Reply |
| 2 | Transmit Power Control (TPC) Request |
| 3 | TPC Report |
| 4 | Channel Switch Announcement |
| 5 | Mesh Interim Channel Switch Announcement |
| 6 | Mesh Channel Switch Announcement |
| 7-255 | Reserved |

The M-CSA action is transmitted by an AP/IAP in a wireless communication system to advertise a channel switch for scanning. The format of the M-CSA action frame is shown in the following figure.

Figure - M-CSA action frame body format

| | Category | Action | Mesh Channel Switch Announcement |
|---|---|---|---|
| Octets | 1 | 1 | 7 |

Generally, the Category field is set to 0 (representing spectrum management). Also, the Action field is set to 6 (representing a Mesh Channel Switch Announcement frame—MI-CSA). It will be appreciated by those having ordinary skill in the art that the action frame formats shown above are exemplary, as such other formats for action frames are within the scope of the various embodiments.

FIG. 8 is a block diagram illustrating an apparatus of a node employed in the network shown in FIG. 1. The apparatus 800 implements the methods 300 and 400 described in FIGS. 3 and 4 in accordance with various embodiments of the present invention. The apparatus 800 can be any type of wireless communication device including, but not limited to, cellular, mobile, and wireless telephones; PCs (personal computers), laptop, notebook, and wearable computers with wireless modems, PDAs (personal digital assistants) with wireless modems; and wireless messaging devices. Apparatus 800 also illustrates functional blocks of the nodes 102, 106, and 107 of wireless communication system 100 as shown in FIG. 1 in accordance with embodiments of the invention.

As shown in FIG. 8, apparatus 800 comprises a transceiver 810, a controller 820, and a memory 830. The apparatus 800 can further comprise an antenna (not shown). The antenna (not shown) may be an omni-directional, sectored, MIMO (Multiple In, Multiple Out, a technology that allows antennae to process numerous incoming and outgoing signals simultaneously), or smart antenna array which is configured to transmit or receive a data to or from any local node in the wireless communication system 100. The transceiver 810 transmits/receives signals via the antenna (not shown). In one embodiment, the transceiver 810 operating to send a message to a plurality of neighboring nodes, wherein the message comprises information at least a reason for discontinuation of communications at the first channel and a duration for a channel switch operation after which the node is available for communications at the first channel or an alternate channel.

The transceiver 810 is coupled to a controller 820. The controller 820 is configured to detect a need to discontinue communications at a first channel and to process different action frames to announce the channel switch operation. FIG. 8 also shows a memory element 830 coupled to the controller 820.

Those skilled in the art would realize that the apparatus 800 can also include other hardware units (not shown) such as an user interface including a display, keypad, loudspeaker, and/or microphone, antenna switch, duplexer, circulator, or other highly isolative means for intermittently providing information packets from the transmitter circuitry (not shown) in the transceiver 810 to the antenna (not shown) and from the antenna (not shown) to the receiver circuitry (not shown) in transceiver 810. Alternatively, the apparatus 800 can comprise a collection of appropriately interconnected units or devices, wherein each unit or device performs functions that are equivalent to the functions performed by the elements of the apparatus 800.

Announcing channel switch operation and selecting a channel in accordance with embodiments of the invention facilitates proactive scanning of other channels available at the IAP/Gateway/AP without disrupting the meshing services. The method of channel selection wherein the mesh devices informs all associated devices about the channel switch operation, the reason for the channel switch, and the duration of the channel switch facilitates smooth transition to other channel without disrupting meshing services.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for communicating a channel switch operation in a wireless communication system, the method comprising:
   at a first node:
      detecting a requirement to discontinue communications on a first channel;
      sending a message to at least a second node from a plurality of nodes, wherein the message comprises a reason for discontinuation of communications by the node on the first channel, information indicating availability of other channels at the first node for communications, and a duration of the channel switch operation;

performing a channel switch operation during the duration of the channel switch operation; and
sending a second message to at least the second node, wherein the second message comprises information about a future channel of operation.

2. The method of claim 1 further comprising, scanning for an alternate channel from a list of available channels during the duration of the channel switch operation.

3. The method of claim 1, wherein detecting comprises at least one of:
detecting a radar signal at the first channel;
detecting congestion at the node; and
detecting a need for a periodic scan.

4. The method of claim 1, wherein the sending comprises multicasting or broadcasting the message and the second message to all nodes associated with the first node.

5. The method of claim 2, wherein the future channel of operation is one of the first channel and an alternate channel.

6. The method of claim 1, wherein the second message further comprises the reason for discontinuation of communications at the first channel.

7. The method of claim 1, wherein the second message is sent during the duration of the channel switch operation.

8. The method of claim 1, further comprising:
at the second node:
receiving the message from first node,
determining based on the information in the message and neighborhood conditions, whether there is a requirement to scan alternate channels
when there is a requirement:
scanning alternate channels to communicatively bind to the first node or a different node than the first node.

9. The method of claim 8 further comprising:
forwarding the message to nodes associated with the first node based on the information in the message, wherein the message further comprises originator device type.

10. The method of claim 8, wherein the first node is an Intelligent Access Point (IAP).

11. The method of claim 10 further comprising:
maintaining a list of IAPB associated with each channel of a plurality of channels; and
determining based on route metric and Received Signal Strength Indication (RSSI), an associated best IAP for each channel of the plurality of channels.

12. The method of claim 11 further comprising:
detecting a radar signal locally; and
scanning the plurality of channels to initiate communications with a new IAP.

13. The method of claim 12, wherein the scanning comprises selecting the new IAP amongst the best IAPB associated with each channel of the plurality of the channels.

14. The method of claim 1, wherein the node is an Intelligent Access Point (IAP).

15. The method of claim 1, wherein the second node is a neighbor node of the first node.

16. The method of claim 1, further comprising:
at the second node:
receiving the message from the first node;
determining based on the information in the message and neighborhood conditions, whether there is a requirement to scan alternate channels to initiate communications with other nodes;
when there is not a requirement:
waiting for the second message from the first node.

17. The method of claim 16 further comprising:
receiving the second message from the second node; and
switching to the future channel of operation to communicate with the second node.

18. A node in a wireless communication network, the node comprising:
a controller, operating to detect a need to discontinue communications at a first channel and to perform a channel switch operation during a duration of a channel switch operation; and
a transceiver operating to send a message and a second message to at least one node from a plurality of nodes, wherein the message comprises a reason for discontinuation of communications by the node at the first channel, information indicating availability of other channels at the first node for communications, and the duration of the channel switch operation, and wherein the second message comprises information about a future channel of operation.

19. A method for communicating a channel switch operation in a wireless communication system, the method comprising:
communicating a message, from a first node to an at least a second node from a plurality of node, when the first node detects a requirement to discontinue communications on a first channel, wherein the message comprises a reason for discontinuation of communications by the first node on the first channel, information indicating availability of other channels at the first node for communications, and a duration of the channel switch operation.

* * * * *